E. J. FOSTER & F. H. GRAFTON.
COMBINED HAY RAKE AND SHOCKER.
APPLICATION FILED APR. 17, 1909.
978,725.
Patented Dec. 13, 1910.
4 SHEETS—SHEET 2.
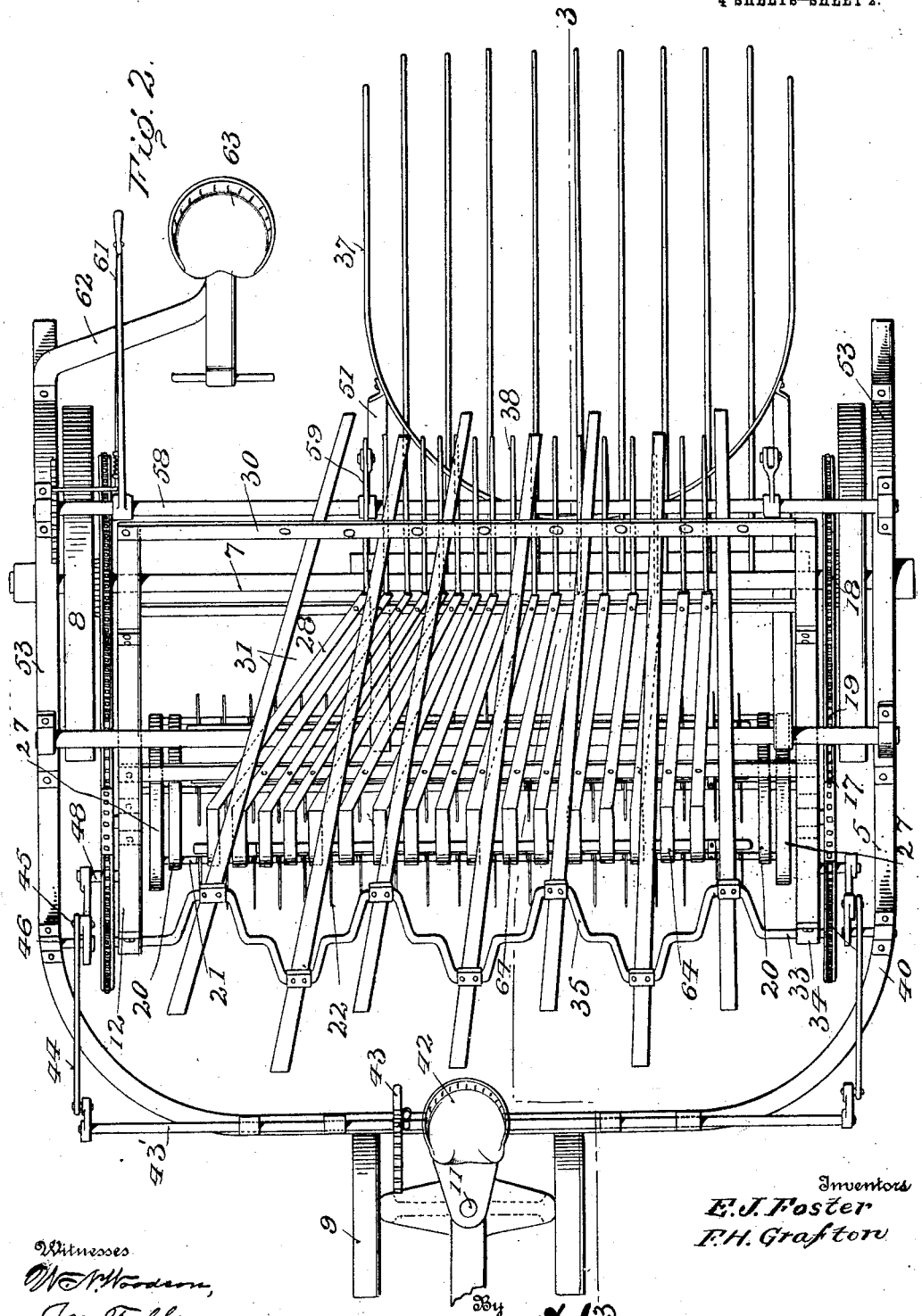
Witnesses
W. N. Woodson
J. M. Fallin
Inventors
E. J. Foster
F. H. Grafton
By
H. A. P. Lacey, Attorneys E. J. FOSTER & F. H. GRAFTON.
COMBINED HAY RAKE AND SHOCKER.
APPLICATION FILED APR. 17, 1909.
978,725.
Patented Dec. 13, 1910.
4 SHEETS—SHEET 3.
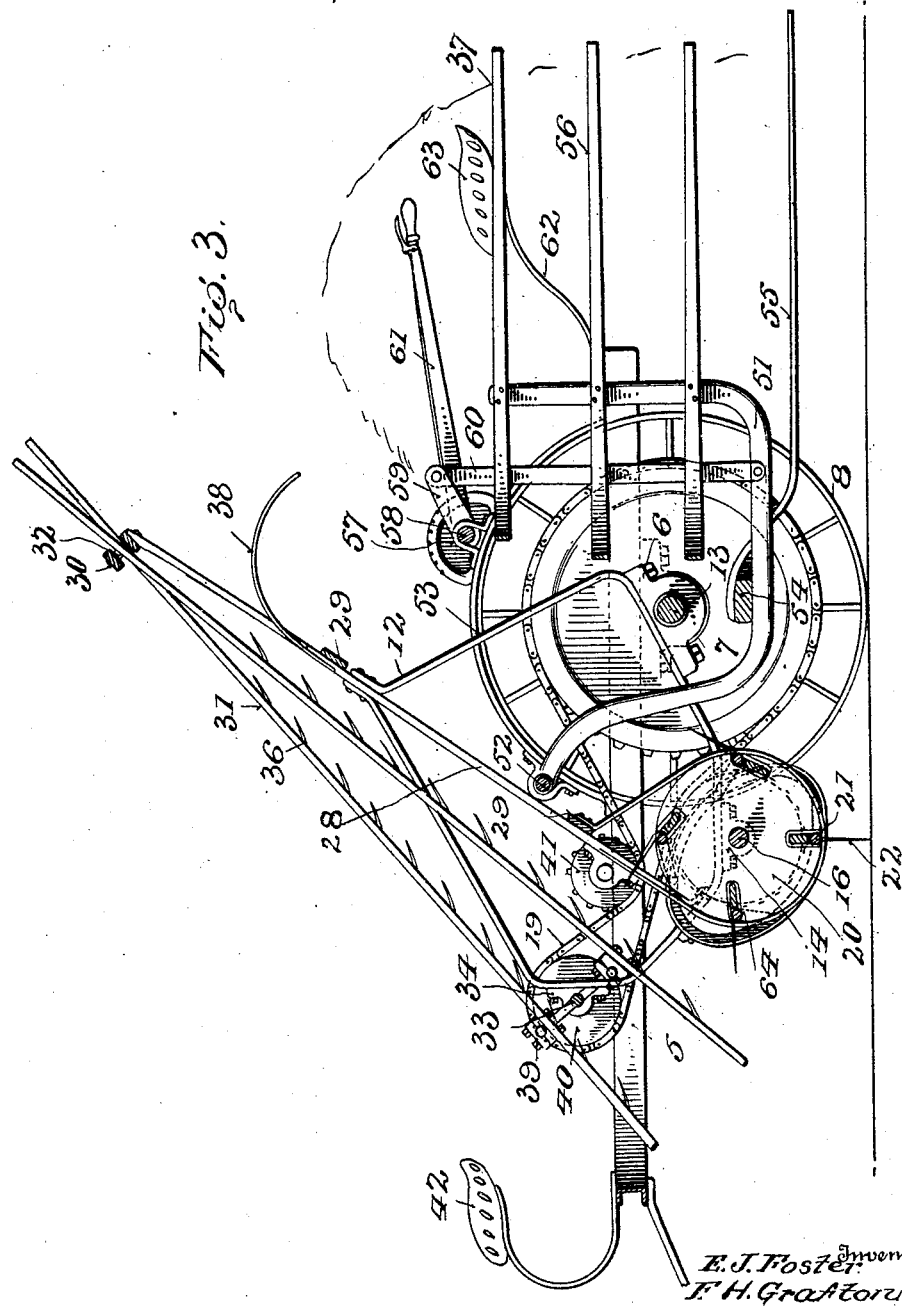

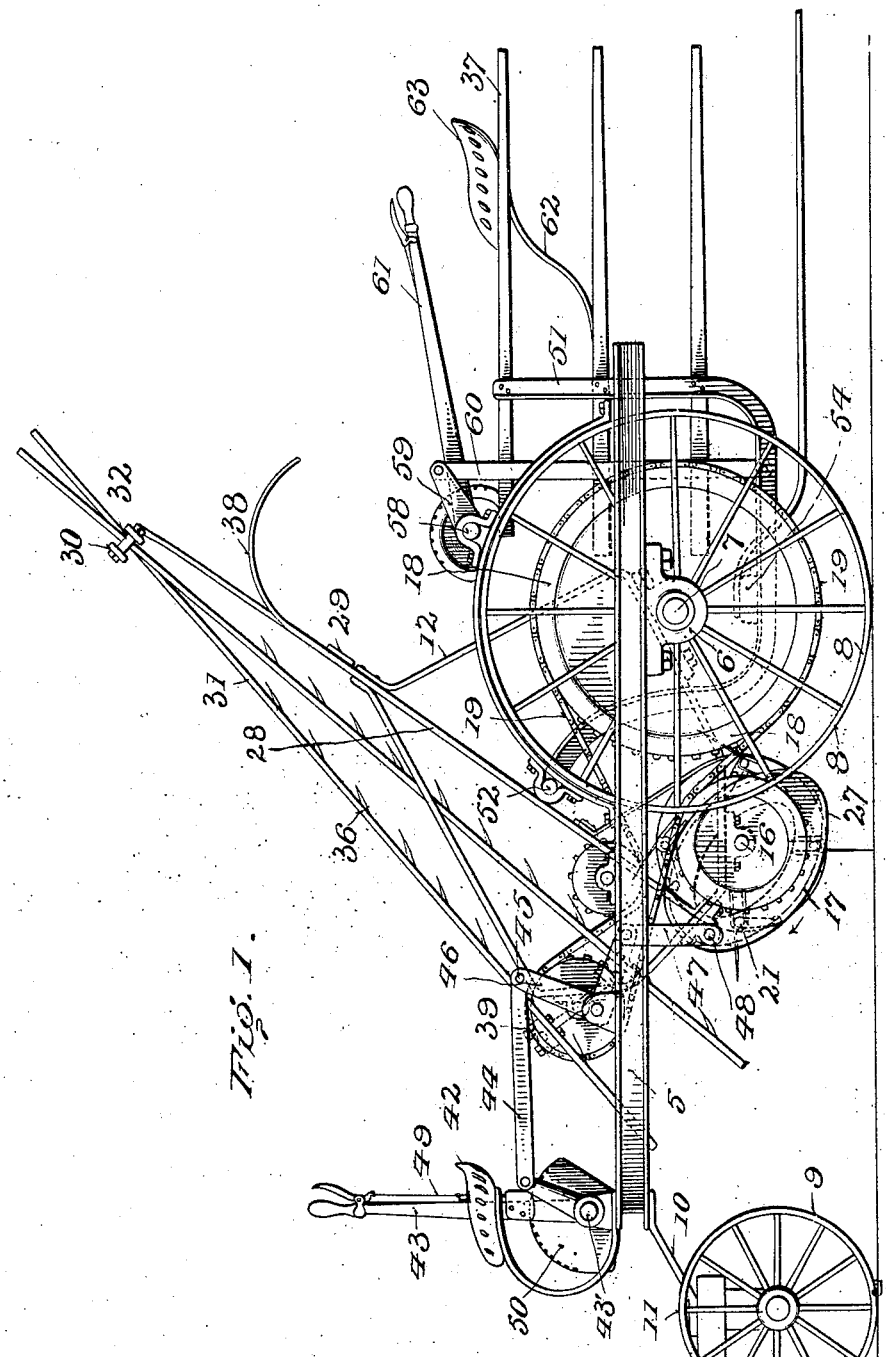

E. J. FOSTER & F. H. GRAFTON.
COMBINED HAY RAKE AND SHOCKER.
APPLICATION FILED APR. 17, 1909.
978,725.
Patented Dec. 13, 1910.
4 SHEETS—SHEET 4.
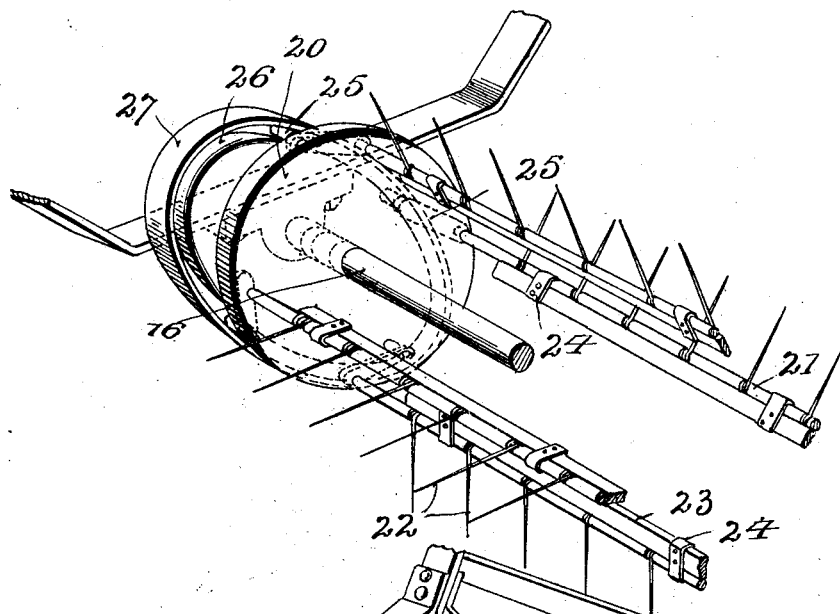

UNITED STATES PATENT OFFICE.

EPHRAIM J. FOSTER, OF STEUBENVILLE, OHIO, AND FRANK H. GRAFTON, OF WHEELING, WEST VIRGINIA, ASSIGNORS OF ONE-FOURTH TO JAMES M. FOSTER, OF STEUBENVILLE, OHIO, AND ONE-FOURTH TO WILLIAM S. GRAFTON, OF WHEELING, WEST VIRGINIA.

COMBINED HAY RAKE AND SHOCKER.

978,725.        Specification of Letters Patent.     Patented Dec. 13, 1910.

Application filed April 17, 1909. Serial No. 490,466.

*To all whom it may concern:*

Be it known that we, EPHRAIM J. FOSTER and FRANK H. GRAFTON, citizens of the United States, residing at Steubenville and Wheeling, respectively, in the counties of Jefferson and Ohio, respectively, and States of Ohio and West Virginia, respectively, have invented certain new and useful Improvements in Combined Hay Rakes and Shockers, of which the following is a specification.

This invention relates to agricultural machinery and more particularly to that class of machines especially designed for gathering hay and other material and forming the same into shocks or hacks.

The object of this invention is to provide a combined hay rake and shocker capable of being operated by two men or a man and a boy and in which hay or other material is gathered from the ground and formed immediately into a shock or hack, thus avoiding the present method of raking into winrows and gathering the winrows into shocks or hacks, which latter process requires the labor of seven or eight men.

A further object of the invention is to provide a combined rake and shocker in which hay or other material is gathered from the ground and deposited on an inclined apron or table for delivery to a shock receiving basket or cradle, the latter being pivotally mounted for tilting movement on the main supporting frame so that after sufficient hay has been deposited in the cradle to form a shock, the cradle may be dumped to effect the discharge thereof.

A further object is to provide a machine of the character described in which the hay is deposited in the basket or cradle in superposed layers thereby to prevent the hay from becoming tangled and thus facilitate the future handling of the same, as, for instance, when assembling the shocks or hacks to form a stack, or when loading on a wagon.

A further object is to provide means for effecting the vertical adjustment of the rake and rake bars, and means independent of the rake-adjusting means for dumping the shock receiving cradle or basket.

A still further object of the invention is generally to improve this class of machines so as to increase their utility, durability and efficiency.

Further objects and advantages will appear in the following description, it being understood that various changes in form, proportion and minor details of construction may be resorted to within the scope of the appended claims.

For a full understanding of the invention, reference is to be had to the following description and accompanying drawings, in which:

Figure 1 is a side elevation of a combined hay rake and shocker constructed in accordance with our invention. Fig. 2 is a top plan view of the same. Fig. 3 is a longitudinal sectional view thereof. Fig. 4 is a detailed perspective view of a portion of the revolving rake and one of the actuating cams. Fig. 5 is a detailed perspective view of a portion of the inclined table or apron, showing the construction of the stripping devices or bars.

Corresponding and like parts are referred to in the following description and indicated in all views of the accompanying drawings, by the same reference numerals.

The combined hay rake and shocker forming the subject matter of the present invention comprises a substantially U-shaped main supporting frame 5, to the side bars of which are secured dependent brackets 6 in which is rigidly secured an axle 7 carrying traction wheels, indicated 8. The closed end of the main supporting frame 5 is supported on the front wheels 9 by means of a forwardly and downwardly inclined bar 10, one end of which is rigidly secured to the main supporting frame 5 while the opposite end thereof is fastened to a king bolt 11, thereby to permit the machine to make relatively short turns.

Pivotally mounted on the rear axle 7 of the truck is an auxiliary frame 12 comprising spaced side members, each of which is provided with a bearing 13 for the reception of the axle 7.

Fastened in any suitable manner to the side members comprising the auxiliary frame are transversely alined brackets 14 in which is journaled a suitable shaft 16 carrying sprocket wheels 17, the latter being connected to similar sprocket wheels 18 on the adjacent ground wheels 8 through the medium of sprocket chains 19, whereby motion may be transmitted from the traction wheels to the rake to rotate the latter. The sprocket wheels 18 are connected to the ground wheels 8 by the usual pawl and ratchet mechanism (not shown), so that when either ground wheel is going forward, the mechanism will be operated, but a backward movement of either or both ground wheels will not effect the mechanism.

The rake comprises spaced disks or heads 20 connected by a plurality of transverse rods 21, preferably four in number, as shown, and each carrying a series of teeth 22 adapted to engage and gather the hay as the machine is caused to travel over the surface of the field. The rake teeth 22 are each formed of a single length of wire, an intermediate portion of which is coiled around the adjacent transverse rod 21 while the free end thereof is seated in a reinforcing strip 23 disposed within the lines of heads 20 as shown. The strips 23 are rigidly secured to the adjacent transverse rods 21 by clamps 24, thereby to cause the strips 23 to move with the rods 21 and also to form a firm anchorage for the inner ends of the rake teeth. The opposite ends of the rods 21 are extended through the adjacent heads 20 and are provided with terminal crank arms 25 for engagement with the seating groove 26 of a cam member 27 secured to the frame as best shown in Fig. 4 of the drawings. Thus it will be seen that when motion is transmitted to the sprocket wheels 17 the cams will engage the terminal crank arms of the rods 21 and rotate the latter to gather the hay or other material being operated upon, the construction of the cam being such as automatically to change the position of the teeth 22 as the rake is revolved, allowing them to withdraw from the hay and leave it on the strippers 64 in position for the rake bars 31.

Mounted on the auxiliary frame 12 is an inclined supporting table or apron 28 adapted to receive the hay or other material taken up by the rake teeth as the latter are revolved, said apron or table comprising spaced rearwardly inclined bars connected by one or more transverse reinforcing bars 29.

Secured to the upper end of the apron or table 28 is a keeper 30 between which and the adjacent face of the table 28 is slidably mounted a plurality of rake bars 31, these bars being retained in proper spaced relation to each other by means of suitable spacing blocks 32. The lower ends of the rake bars 31 are secured to a transverse shaft 33 journaled in bearings 34 mounted on the side members of the auxiliary frame 12, this shaft 33 being formed with a series of crank arms 35 for attachment to the adjacent ends of the kicker bars. The crank arms 35 are preferably disposed in staggered relation so that the kicker bars will work in sets, an upward movement being imparted to one set of rake bars while a downward movement is being imparted to an adjacent set. The bars 31 are disposed in spaced relation to the table 28 and are provided with a series of spaced teeth or tines 36 adapted to engage the hay deposited on the table 28 by the revolving rake and automatically feed the latter to a pivoted basket or cradle 37 disposed at the rear end of the machine as shown, there being a rearwardly and downwardly curved deflector 38 secured to the upper end of the table 28 for the purpose of positively directing the material into the cradle or basket 37. The lower ends of the kicker bars 31 are secured to the adjacent cranked shafts 35 by clips or similar fastening devices 39 while the upper ends of said rake bars are inclined laterally toward one side of the machine so that the hay taken up by the teeth 36 will be shifted laterally with respect to the longitudinal plane of the machine and thus facilitate the discharge of the hay into the cradle or receptacle 37. Secured to the opposite ends of the cranked shaft 33 are sprocket wheels 40 which engage the sprocket chains 19, there being an idle sprocket wheel 41 mounted on the auxiliary frame 12 for the purpose of taking up any slack in the sprocket chain 19 when the auxiliary frame is tilted laterally on the rear axle 7 to effect the vertical adjustment of the revolving rake.

Mounted on the main supporting frame near the driver's seat 42 is an operating lever 43 carried by a rock shaft 43¹ having spaced rock arms secured thereto and disposed on opposite sides of the machine as shown, and to which are connected the adjacent ends of the bars 44. The opposite ends of the bars 44 are pivotally connected at 45 to the adjacent arms of bell crank levers 46, the opposite ends of the bell crank levers 46 being connected through the medium of links 47 with pins or studs 48 extending laterally from the auxiliary frame 12 so that by tilting the lever 43 on its pivotal axis the auxiliary frame may be raised or lowered to effect the required adjustment of the rake, said axle frame being locked in adjusted position by a pawl 49 carried by the lever 43 and engaging any one of a series of teeth on a segmental rack, indicated at 50. Thus it will be seen that both the rake and rake bars are operated from the main driving shaft and are adjustable vertically of the supporting frame so as to permit the same to clear any obstruction on the surface of the ground, as for instance, when transferring the machine from one portion of the field to another.

The cradle or basket 37 is open at the rear and is supported on the main frame of the machine by spaced substantially U-shaped bars 51, the inner ends of which are pivotally mounted on a transverse shaft pivoted in suitable bearings on the arcuate bars 53, the latter being secured to the main supporting frame at the open end thereof as best shown in Fig. 3 of the drawings. The intermediate portions of the U-shaped bars 51 are connected by a transverse beam 54 to which are secured a plurality of spaced longitudinally disposed bars 55 constituting the bottom of the cradle 37, the side walls of the cradle or basket 37 being formed of spaced superposed members 56 each having a portion thereof attached to the adjacent U-shaped bars 51 so that when the bars 51 are tilted the open end of the cradle or receptacle 37 will be moved downwardly to effect the discharge of the hay or other material deposited therein.

Journaled in suitable bearings 57 on the arcuate bars 53 is a transverse shaft 58 having two cranked arms 59 secured thereto and operatively connected with the basket or cradle 37 through the medium of depending links 60, there being an operating lever 61 secured to one end of the shaft 58 so that by tilting the lever 61 the basket or cradle 37 may be operated to effect the dumping of the hack or shock, a suitable pawl and rack being provided for locking the lever in different positions of adjustment.

An arm 62 is extended laterally from one of the side bars of the main supporting frame to which is secured a seat 63 so that the operator or attendant may adjust the hay in the cradle as the hack or shock is being formed.

Interposed between the teeth or tines of the rake are a plurality of stripping devices 64 each preferably formed of a single piece of flat metal having its upper end secured in any suitable manner to the apron or table and with its other end curved downwardly and rearwardly and then upwardly for attachment to said table, so that the rods 21 carrying the teeth or tines are revolved by the action of the cams 27, the hay will be stripped from the teeth and deposited on the table or apron in position to be engaged by the teeth 36 of the kicker bars 31. The bars 64 not only form stripping devices but also form in effect a housing for the revolving rake thereby to prevent the hay from coming in contact with the rods 21 and getting tangled and thus interfering with the proper operation of the machine. Thus it will be seen that as the machine travels over the surface of the field, the teeth or tines of the revolving rake will gather up the hay and elevate the same, the hay being stripped from the teeth of the rake by means of the curved bars 64 so that the hay will be deposited on the inclined table or apron 28 and in position to be engaged by the rake bars 31, the motion imparted to said rake bars being such as to feed the hay upwardly over the guard 38 where it will drop into the cradle or basket 37 in superposed layers. After sufficient hay has been deposited in the basket 37 to form a hack or shock the basket may be tilted to effect the dumping of the contents thereof by operating the lever 61 as before stated, the stubble projecting through and between the bars 55 of the cradle or basket 37 serving to assist in discharging the hay therefrom. In order to effect the vertical adjustment of the revolving rake it is merely necessary to manipulate the lever 43 when the auxiliary frame carrying the revolving rake and kicker bars will be tilted on the axle 7 to effect the adjustment thereof, as will be readily understood.

From the foregoing description, it will be seen that there is provided a practical and thoroughly efficient machine, capable of being readily operated by one or two men or attendants, and in which the hay forming the shock is deposited in the cradle or basket in superposed layers thereby to prevent tangling of the hay and also to facilitate the future handling of the same, as, for instance, when forming the hacks or shocks into a stack, or when loading a wagon.

Having thus described our invention, what we claim as new, is:

1. A machine of the class described including a main frame, an axle secured to the main frame and provided with traction wheels, an auxiliary frame pivotally mounted on the axle, an inclined table carried by the auxiliary frame, a rake mounted for rotation on said auxiliary frame, a feeding device co-acting with the table, means for transmitting motion from the traction wheels to the rake and feeding device respectively, and means for tilting the auxiliary frame to effect the simultaneous adjustment of the feeding device and rake.

2. A machine of the class described including a main supporting frame, an axle secured to the main frame and provided with traction wheels, an auxiliary frame pivotally mounted on the axle, an upwardly and rearwardly inclined table carried by the auxiliary frame, a rake mounted for rotation beneath the table and movable with the auxiliary frame, stripping devices interposed between the teeth of the rake, a cradle pivotally mounted on the main supporting frame, rake bars co-acting with the table for feeding the material to the cradle, and means for dumping the latter.

3. A machine of the class described including a main supporting frame, an axle secured to the main frame and provided with traction wheels, an auxiliary frame pivotally mounted on the axle, a table carried by the auxiliary frame, a transverse crank shaft journaled in the auxiliary frame, a rake mounted for rotation beneath the table, a cradle pivotally mounted for tilting movement on the main frame, reciprocating rake bars secured to the crank shaft and spaced from the table for feeding the material deposited on the latter to the cradle, and means for dumping the latter.

4. A machine of the class described including a main supporting frame, an axle secured to the main frame and provided with traction wheels, an auxiliary frame pivotally mounted on the axle, a rearwardly and upwardly inclined table carried by the auxiliary frame, a rake mounted for rotation beneath the table, a dumping cradle, reciprocating rake bars disposed in spaced relation to the table and having their upper ends inclined in the direction of the cradle for feeding material thereto, means for adjusting the rake vertically of the truck, and means for effecting the dumping of the cradle.

5. A machine of the class described including a main supporting frame, an axle secured to the main frame and provided with traction wheels, a transverse shaft mounted on the main frame, a cradle pivotally mounted on the shaft, an auxiliary frame pivotally mounted on the axle, a table carried by the auxiliary frame, a revolving rake disposed beneath the table and movable therewith, stripping devices co-acting with the rake teeth, and a feeding device disposed in spaced relation to the table for delivering the hay to the cradle.

6. A machine of the class described including a main supporting frame, an axle secured to the frame and provided with traction wheels, a cradle pivotally mounted on the main frame, an auxiliary frame pivotally mounted on the axle, a table carried by the auxiliary frame, a rake mounted for rotation beneath the table, a feeding device for transferring the hay from the table to the cradle, means for dumping the cradle, and means independent of the dumping means for effecting the vertical adjustment of the rake.

7. A machine of the class described including a main supporting frame, an axle secured to said frame and provided with traction wheels, a forward truck pivotally mounted on the main frame, arcuate bars carried by said main frame and provided with bearings, a shaft journaled in said bearings, a cradle having rearwardly extending arms pivotally mounted on said shaft, an auxiliary frame pivotally mounted on the axle, an upwardly and rearwardly inclined table carried by the auxiliary frame, a rake disposed beneath the table, a feeding device for transferring material from the table to the cradle, means for stripping the material from the rake teeth, means for effecting the dumping of the cradle, and means for adjusting the rake vertically of the supporting frame.

8. A machine of the class described including a main supporting frame, an axle secured to the main frame and provided with traction wheels, an auxiliary frame pivotally mounted on the axle of the main frame and including spaced members connected by inclined bars constituting a table, a rake mounted for rotation beneath the table, a cradle pivotally mounted on the main frame, means co-acting with the table for transferring material from said table to the cradle, means for transmitting motion from the traction wheels to the rake and feeding device respectively, means for dumping the cradle and means independent of the dumping means for effecting the vertical adjustment of the rake.

9. A machine of the class described including a main supporting frame, an axle secured to the frame provided with traction wheels, an auxiliary frame pivotally mounted on the axle and including spaced side members, an upwardly and rearwardly inclined table interposed between the said members of the auxiliary frame, a rake carried by said auxiliary frame and mounted for rotation beneath the table, curved bars interposed between the rake teeth for stripping the hay from said teeth, a cradle pivotally mounted on the frame, rake bars mounted for reciprocation in spaced relation to the table and having their upper ends inclined in the direction of the cradle for feeding the material thereto, and means forming a connection between the traction wheels, rake and rake bars, respectively, for simultaneously actuating same.

10. A machine of the class described including a main supporting frame, a cradle, an auxiliary frame pivotally mounted on the main frame, an upwardly inclined table carried by the auxiliary frame and provided with terminal deflectors for directing the material into the cradle, a rake mounted for rotation beneath the table, a crank shaft journaled in the auxiliary frame, rake bars secured to the crank shaft for feeding the hay from the table to the cradle, means for operating the rake and the rake bars, means for dumping the cradle, and means independent of the cradle dumping means for tilting the auxiliary frame thereby to effect the vertical adjustment of the rake.

11. A machine of the class described including a main supporting frame, an axle mounted on the frame and provided with traction wheels, an auxiliary frame pivotally mounted on said axle, a table carried by the auxiliary frame, a rake mounted for rotation beneath the table and provided with a sprocket wheel, a crank shaft journaled in the auxiliary frame and provided with a similar sprocket wheel, rake bars secured to the crank shaft, a cradle pivotally mounted on the frame, a sprocket wheel secured to the axle, a chain connecting the sprocket wheel on the axle with the sprocket wheels on the rake and crank shaft, respectively, for simultaneously actuating the same, means for effecting the dumping of the cradle, and means for tilting the auxiliary frame thereby to raise or lower the rake.

12. A machine of the class described including a main frame, an axle secured to the frame and provided with traction wheels, an auxiliary frame pivotally mounted on the axle, a shaft journaled in the auxiliary frame, cams carried by the auxiliary frame, and each provided with a grooved face, heads spaced inwardly from the cams, rods having their opposite ends extended through the heads and provided with terminal crank arms arranged to enter the grooves of the cams, a plurality of rake teeth carried by the rods, an inclined table mounted on the auxiliary frame, curved bars carried by the table and interposed between the rake teeth, a cradle pivotally mounted on the main frame, a feeding device for transferring the hay from the table to the cradle, and a sprocket chain operatively connected with the shaft of the auxiliary frame, feeding devices and axle for transmitting motion from one to the other.

13. A machine of the class described including a main supporting frame, an axle secured to the frame and provided with traction wheels, curved bars secured to the main frame and provided with a plurality of bearings, spaced shafts journaled in said bearings, a cradle having rearwardly extending arms pivotally connected with one of said shafts, crank arms carried by the other shaft and pivotally connected with the cradle, a rotary rake, a table disposed above the rake, rake bars mounted for reciprocation in spaced relation to the table and having their upper ends inclined in the direction of the cradle, means for transmitting motion from the axle to the rake and rake bars respectively, and an operating lever secured to one of the transverse shafts for oscillating the latter to effect the dumping of the cradle.

14. A machine of the class described including a main supporting frame, an axle secured to the frame provided with traction wheels, a cradle pivotally mounted on the main frame, an auxiliary frame pivotally mounted on the axle of the main frame, and provided with an upwardly and rearwardly inclined table having a terminal deflector for positively directing the material from the table into the cradle, a rake mounted for rotation beneath the table, means for stripping the hay from the rake teeth, rake bars mounted for reciprocation in spaced relation to the table for feeding the material from the table to the cradle, means forming a connection between the axle, rake and rake bars respectively for operating the same, a lever, and means forming a connection between the lever and auxiliary frame for tilting the latter to effect the vertical adjustment of the rake.

In testimony whereof we affix our signatures in presence of two witnesses.

EPHRAIM J. FOSTER. [L. S.]
FRANK H. GRAFTON. [L. S.]

Witnesses:
J. C. AULT,
B. N. LINDUFF.